United States Patent
Assmann et al.

(10) Patent No.: US 11,130,408 B2
(45) Date of Patent: Sep. 28, 2021

(54) METHOD AND DEVICE FOR SUPPLYING, IN PARTICULAR A RAIL VEHICLE, WITH MAIN AND AUXILIARY AIR

(71) Applicant: KNORR-BREMSE SYSTEME FÜR SCHIENENFAHRZEUGE GMBH, Munich (DE)

(72) Inventors: Gert Assmann, Munich (DE); Thomas Merkel, Hürth (DE); Peter Berger, Unterschleissheim (DE); Boris Wittich, Munich (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 109 days.

(21) Appl. No.: 15/753,817

(22) PCT Filed: Aug. 12, 2016

(86) PCT No.: PCT/EP2016/069199
§ 371 (c)(1),
(2) Date: Feb. 20, 2018

(87) PCT Pub. No.: WO2017/032616
PCT Pub. Date: Mar. 2, 2017

(65) Prior Publication Data
US 2018/0265066 A1  Sep. 20, 2018

(30) Foreign Application Priority Data

Aug. 21, 2015  (DE) ............ 10 2015 113 940.5

(51) Int. Cl.
*B60L 5/32* (2006.01)
*B60T 17/22* (2006.01)
(Continued)

(52) U.S. Cl.
CPC .............. *B60L 5/32* (2013.01); *B60T 17/228* (2013.01); *B60L 1/003* (2013.01); *B60T 17/02* (2013.01); *B61C 3/00* (2013.01)

(58) Field of Classification Search
CPC ..................................... B60L 5/16; B60L 5/32
(Continued)

(56) References Cited

U.S. PATENT DOCUMENTS 9,956,879 B2 * 5/2018 Urra ................. B60T 13/665
10,266,057 B2 * 4/2019 Glinka ................ B60L 5/32
(Continued)

FOREIGN PATENT DOCUMENTS

CN   101541606 A   9/2009
CN   201863864 U   6/2011
(Continued)

OTHER PUBLICATIONS

WO 2011101293 machine translation to English from espacenet. 2011.*
(Continued)

*Primary Examiner* — Thomas E Lazo
*Assistant Examiner* — Michael Quandt
(74) *Attorney, Agent, or Firm* — Barnes & Thornburg LLP

(57) ABSTRACT

A method and device supply a vehicle with main and auxiliary air, wherein the device includes a compressor driven via an electric motor for generating compressed air to fill at least one main air tank for supplying pneumatic units of the vehicle, wherein the vehicle has at least one first and second power source for supplying electric energy, wherein a pneumatic actuator that upgrades the vehicle and activates the first power source is provided with the compressed air produced by the compressor in that, in that phase, the second power source feeds the electric motor of the compressor,
(Continued)

wherein a switching valve device supplies the compressed air for upgrading to an auxiliary air tank associated with the pneumatic actuator, and otherwise the switching valve device supplies the compressed air produced by the to the main air tank.

12 Claims, 1 Drawing Sheet

(51) Int. Cl.
*B60L 1/00* (2006.01)
*B60T 17/02* (2006.01)
*B61C 3/00* (2006.01)

(58) Field of Classification Search
USPC .............................................. 191/67, 87, 90
See application file for complete search history.

(56) References Cited

U.S. PATENT DOCUMENTS

| | | |
|---|---|---|
| 2016/0200198 A1 | 7/2016 | Glinka et al. |
| 2016/0221447 A1 | 8/2016 | Urra et al. |

FOREIGN PATENT DOCUMENTS

| | | |
|---|---|---|
| CN | 102431458 A | 5/2012 |
| DE | 10336058 B3 | 1/2005 |
| DE | 102008056479 A1 | 5/2010 |
| DE | 102010008636 A1 | 8/2011 |
| DE | 102013109475 A1 | 3/2015 |
| DE | 102013217429 A1 | 3/2015 |
| EP | 2536957 B1 | 12/2012 |
| JP | S59176301 U | 11/1984 |
| JP | S61-032701 U | 2/1986 |
| JP | 05009101 U | 2/1993 |
| JP | 2004019625 A | 1/2014 |
| KR | 10-1434311 B1 | 8/2014 |
| RU | 2 100 220 C1 | 12/1997 |
| RU | 130273 U1 | 7/2013 |
| WO | 2015028532 A2 | 3/2015 |

OTHER PUBLICATIONS

Russian Search Report corresponding to Russian Application 2018109581/11 dated Nov. 13, 2018.
Search Report for International Patent Application No. PCT/EP2016/069199; dated Nov. 25, 2016.
Japanese Office Action corresponding to Japanese Application 2018-509780 dated Sep. 30, 2019.

* cited by examiner

METHOD AND DEVICE FOR SUPPLYING, IN PARTICULAR A RAIL VEHICLE, WITH MAIN AND AUXILIARY AIR

PRIORITY CLAIM

This patent application is a U.S. National Phase of International Patent Application No. PCT/EP2016/069199, filed Aug. 12, 2016, which claims priority to German Patent Application No. 10 2015 113 940.5, filed Aug. 21, 2015, the disclosures of which are incorporated herein by reference in their entirety.

FIELD

The disclosed embodiments relates to a method and a device for supplying main and auxiliary air to a vehicle having a compressor that is driven via an electric motor so as to generate compressed air for filling at least one main air container for supplying pneumatic units of the vehicle, wherein the vehicle is supplied with electrical energy via at least one first and second energy source, and wherein a pneumatic adjustment drive is operated so as to prepare the vehicle for use and to activate the first energy source using the compressed air that is generated by the compressor, in that the electric motor of the compressor is supplied in this phase via the second energy source.

BACKGROUND

The disclosed embodiments will be primarily used in the construction of rail-borne vehicles, namely electrically-operated rail-borne vehicles that tap the electrical energy that is required for the operation from an overhead line, by way of example via a pantograph. In addition to this first energy source the vehicles in question also comprise a second energy source, by way of example in the form of a vehicle battery for storing electrical energy, the second energy source is provided to supply electrical auxiliary units in the event of the first energy source not being available. The compressed air that is generated by the compressor is primarily used to supply pneumatic units such as a vehicle braking system. It is also conceivable to use the present disclosed embodiments on non-rail-borne vehicles such as trolley buses and the like.

SUMMARY

Disclosed embodiments improve a method and also a device for supplying main and auxiliary air in the generic manner to the extent that using simple technical means it is rendered possible to divert auxiliary air in a controlled manner in order to prepare the vehicle for use.

The object is achieved by means of the technical aspects of the claimed method and corresponding device for supplying main air and auxiliary air.

BRIEF DESCRIPTION OF FIGURES

Further details and advantages of the invention will now be explained in more detail with reference to an exemplary embodiment which is illustrated in the drawings.

In the drawings.

DETAILED DESCRIPTION

Figure 1:
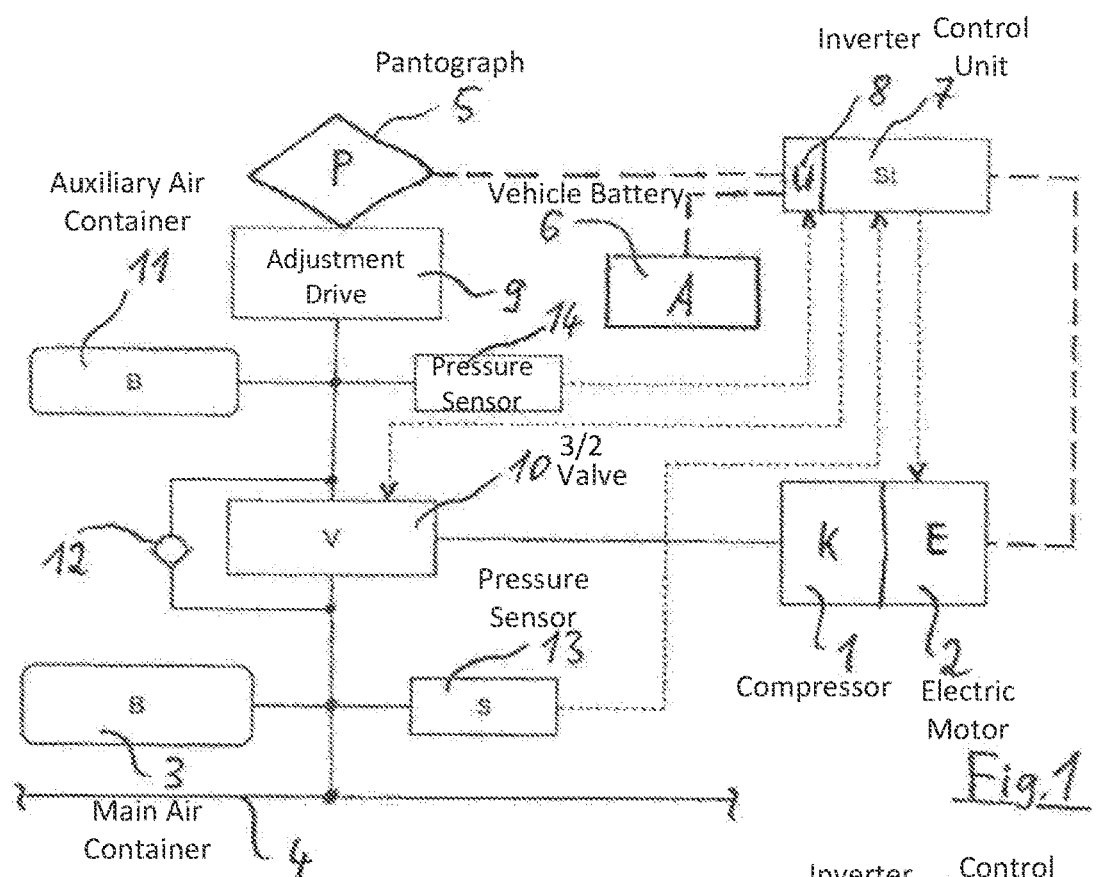
FIG. 1 schematically illustrates a block diagram of a device for supplying a rail-borne vehicle with main and auxiliary air having a switching valve device in accordance with a first embodiment, and FIG. 2 schematically illustrates a block diagram of a device for supplying a rail-borne vehicle with main and auxiliary air having a switching valve device in accordance with a second embodiment.

In accordance with the generally known prior art, in order to supply auxiliary air, in addition to a main compressor usually a so-called auxiliary compressor is used that provides the pneumatic energy for the adjustment drive of the pantograph and the like. A separate auxiliary air compressor of this type is supplied with electrical energy by means of the vehicle battery of the rail-borne vehicle and comprises a relatively low output power with respect to the main compressor. The electrical energy of the vehicle battery is sufficient in order to drive the auxiliary air compressor in an electromotive manner with the result that it is possible to generate sufficient compressed air for supplying the auxiliary air.

DE 10 2013 109 475 A1 discloses a technical solution in which a separate auxiliary air compressor of this type is not necessary since its function is assumed by the main compressor of the vehicle. With regard to the auxiliary air supply when the vehicle is being prepared for use via the main compressor, the electric motor that is driving the compressor is operated via a frequency inverter using the electrical energy that is provided by the vehicle battery. The drive energy that is produced in this manner suffices for operating the main compressor at a relatively low rotational speed and the compressed air for supplying the auxiliary air is diverted from a secondary line of the compressed air supply line. The auxiliary air diversion is performed downstream of an air-drying unit that is connected downstream of the main compressor. In order to prevent a return flow of compressed air from the main air container, a non-return valve is provided in the inlet of the main air container. Further valve means for diverting compressed air for the auxiliary air container are not provided.

Thus, disclosed embodiments improve a method and also a device for supplying main and auxiliary air in the generic manner to the extent that using simple technical means it is rendered possible to divert auxiliary air in a controlled manner in order to prepare the vehicle for use.

The disclosed embodiments include the technical doctrine that the compressed air for preparing the vehicle for use is supplied from a (main) compressor, which is preferably battery-operated via the second energy source, via a switching valve device to an auxiliary air container that is allocated to the pneumatic adjustment drive of the pantograph or main switch. Otherwise, in other words after the vehicle has been prepared for use and the first energy source has been activated, the compressed air that is generated by the compressor is supplied via the switching valve device to the main air container.

The advantage of the solution in accordance with the disclosed embodiments resides in particular in the fact that the procedure of preparing the vehicle for use, in other words producing the operational readiness, may occur without a separate auxiliary compressor by means of applying by way of example a pantograph to an electrical overhead line even if in the starting state the main air container and auxiliary air container are depleted. The fact that the electric motor of the compressor is supplied by way of example via the vehicle battery as a second energy source means that the compressor is able to fill the auxiliary air container with compressed air in an initially valve-controlled manner using sufficient output power for the operation of the pneumatic adjustment drive of the pantograph in order to consequently extend the pantograph. If the first energy source is subsequently connected via the pantograph, it is possible to operate the compressor using a normal output power and the compressed air that is consequently generated is made available via the switching valve device to the main air container and a main air container line that is preferably allocated to the main air container. The switching valve device in accordance with the disclosed embodiments therefore renders possible a needs-based compressed air supply, in particular in the operating phase of preparing the vehicle for use.

Even during the normal operation of the vehicle, in other words not during the preparation procedure, it is possible to activate the switching valve device by means of the pressure in the auxiliary air container in such a manner that when the pressure level in the auxiliary air container is below a minimum pressure the container is refilled with compressed air. If the desired pressure in the auxiliary pressure container is achieved, it is thus possible to switch the switching valve device back with the result that the main air container may be refilled on demand by means of the compressed air that is generated by means of the compressor. This measure ensures that the auxiliary air container is filled with compressed air with a higher priority than the main air container. The switching pressure of the switching valve device is preferably below the nominal supply pressure of the main air container. If the nominal supply pressure is at 8.5 to 10 bar, it is possible for the switching pressure to be by way of example 7.5 bar.

Alternatively or in addition thereto, it is proposed to fill the auxiliary air container with compressed air from the main air container in the event that sufficient compressed air is contained herein. It is therefore possible in a simple manner to provide a valve element that is connected in parallel to the switching valve device and it is also possible for the valve element to be an integral part of the switching valve device. The parallel-connected valve element connects the main air container to the auxiliary air container by bypassing the switching valve device. In the simplest case, the valve element may be configured as a spring-loaded non-return valve having a through flow direction from the main air container to the auxiliary air container. It is possible to set the switching pressure via the resilient strengths of the non-return valve. However, in accordance with an alternative embodiment, it is also possible to use a different mechanically, pneumatically, hydraulically or electrically-actuated valve in lieu of a non-return valve.

The switching valve device in accordance with the disclosed embodiments actuated in an electrical manner, wherein the control unit in this case provides an electrical control signal. The switching valve device in accordance with the disclosed embodiments may also be actuated pneumatically or hydraulically in lieu of mechanically. It is to an extent also possible for the switching valve device to be realized by means of an overflow valve and for the pressure sensors to be realized by means of pressure switches in a purely mechanical manner. In this case, it is also possible to omit a control unit, in particular an electronic control unit.

In the case of an electrically-actuated switching valve device, the control unit is configured as an electronic control unit that is electrically connected on the input side to a pressure sensor on the main air container and also to a pressure sensor on the auxiliary air container. It is also possible to use binary switching pressure switches in lieu of pressure sensors. As a consequence, the electronic control unit always comprises the current information of the prevailing pressure level in the two containers and may control the compressed air supply to the auxiliary air container and main air container depending upon priority, and the electronic control unit provides a corresponding switching signal for the switching valve device that may be actuated in an electrical manner. In addition thereto it is also possible via the electronic control unit to actuate the electric motor of the compressor.

Optionally, the output power of the compressor is set by an inverter, is connected upstream of the electric motor, by means of varying the voltage and/or the frequency. This may either be performed in a variable manner or in fixed stages. Alternatively thereto, the output power of the compressor may also be varied by means of an electric, pneumatic, hydraulic or mechanical actuation of a valve device, by way of example a ventilating device, on the compressor, by way of example between the high pressure stage and low pressure stage of a piston compressor that is multistage in this respect.

The switching valve device in accordance with the disclosed embodiments may be configured in accordance with a first exemplary embodiment as a 3/2 way valve that in a first switching position supplies the supply pressure that is generated by the compressor to the auxiliary air container and in a second switching position supplies the supply pressure that is generated by the compressor to the main air container.

In accordance with a second exemplary embodiment, the switching valve device may also be configured as a 2/2 way valve that in an opened switching position supplies the supply pressure that is generated by the compressor to the main air container and in a closed switching position blocks this connection, wherein in addition to this a permanent compressed air connection exists from the compressor to the auxiliary air container. In the case of this embodiment, the procedure of influencing the auxiliary air container with compressed air is prioritized without it being necessary for this purpose to activate the switching valve device.

It is to be noted that an air-drying unit is usually connected downstream of the compressor for the compressed air supply and the air drying unit sufficiently dries the compressed air that is generated by the compressor from the ambient air before the compressed air is made available to the further compressed air system. The air-drying unit may be configured by way of example as an adsorption air dryer.

Furthermore, it is to be noted that when preparing the vehicle for use it is possible not only to influence the adjustment drive of the pantograph with compressed air from the auxiliary air container but also in addition thereto—if required—by way of example to also influence a main switch that is known per se and may be pneumatically actuated so as to connect the current supply to the vehicle.

In accordance with FIG. 1, within the scope of a main and auxiliary air supply of a rail-borne vehicle (not further illustrated), a compressor 1 is provided for generating compressed air for filling a main air container 3 and also a main air container line 4 that is connected to the main air container. The compressor 1 is driven by means of an electric motor 2. The electrical energy for driving the electric motor 2 is primarily received via a pantograph 5 and overhead line connection. A vehicle battery 6 is used for a second electrical energy supply. The electrical energy supply is controlled by means of a pantograph 5 and vehicle battery 6 via an electronic control unit 7 that also includes an integrated inverter 8 for varying the voltage and frequencies for driving the electric motor 2. The electric motor 2 here is configured as a three-phase motor.

A pneumatic adjustment drive 9 that is allocated to the pantograph 5 is operated so as to extend and retract the pantograph 5 using the compressed air that is generated by the compressor 1.

Since electrical energy is not available from the overhead line when in the phase of preparing the vehicle for use, in which the pantograph 5 is still in the retracted resting position, the electric motor 2 of the compressor 1 is initially supplied with electrical energy via the vehicle battery 6. The electrical energy that may be applied by the vehicle battery 6 suffices in this phase of preparing the vehicle for use in order to operate the compressor 1 with little output power that suffices for activating the pneumatic adjustment drive 9 for extending the pantograph 5.

For this purpose, the compressed air that is generated in a battery-operated manner by the compressor 1 is supplied via a switching valve device 10 that is configured here as an electropneumatic 3/2 way valve to an auxiliary air container 11 according to what is required by the electrical control unit 7 and the auxiliary air container stores the compressed air for operating the pneumatic adjustment drive 9 of the pantograph 5. When not in the phase of preparing the vehicle for use, the switching valve device 10 supplies the compressed air that is generated by the compressor 1 to the main air container 3 of the vehicle. The main air container 3 of the vehicle is preferably filled during the primary electrical energy supply via the pantograph 5.

If at the point in time of preparing the vehicle for use sufficient compressed air between 8.5 to 10 bar is located in the main air container 3, it is thus also possible to fill a depleted auxiliary air container 11 from the main air container. For this purpose, a valve element 12 is provided in the form of a non-return valve that is connected in parallel to the switching valve device 10 and has a through flow direction from the main air container 3 to the auxiliary air container 11.

In the case of this exemplary embodiment, the switching valve device 10 is electrically actuated and the electronic control unit 7 provides for this purpose the electrical switching signal (dotted line). The electronic control unit 10 is supplied on the signal input side with the pressure signal of a first pressure sensor 13 on the main air container 3 and also with the pressure signal of a second pressure sensor 14 on the auxiliary air container 11 (dotted lines). The electronic control unit 10 determines from the pressure signals according to the above-explained logic the switching signal for the switching valve device 10 that may be actuated in an electrical manner, and also according to what is required by the compressor 1.

With regard to the switching valve device 10 that is configured as a 3/2 way valve the supply pressure that is generated by the compressor 1 in a first switching position is supplied to the auxiliary air container 11—in particular in the phase of preparing the vehicle for use—and in a second switching position the supply pressure that is generated by the compressor 1 is supplied to the main air container 3 in order to ensure the main air supply of the vehicle.

Figure 2:
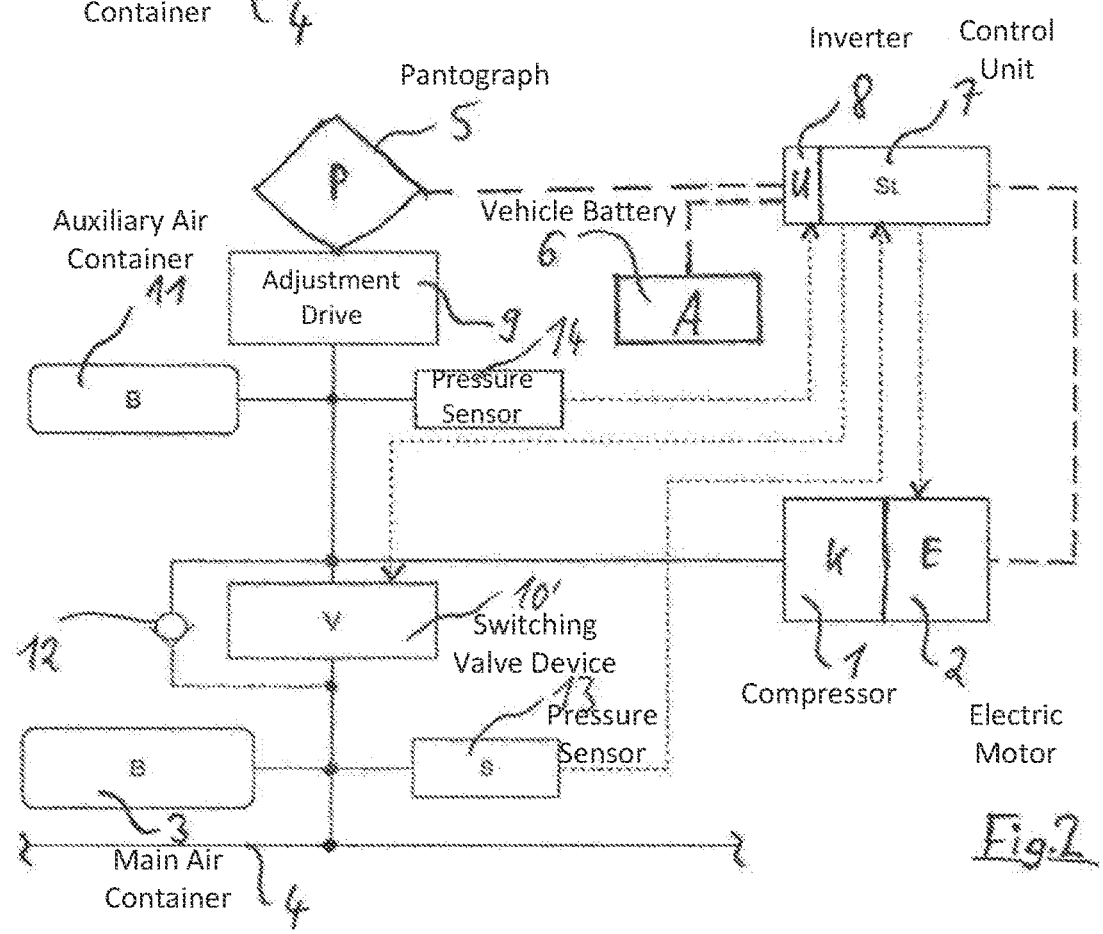

In accordance with the alternative embodiment illustrated in FIG. 2, a switching valve device 10' is configured as a 2/2 way valve. In an opened switching position the switching valve device supplies the supply pressure that is generated by the compressor 1 to the main air container 3. In a closed switching position the switching valve device 10' blocks this connection. In addition, there is a permanent compressed air connection from the compressor 1 to the auxiliary air container 11 that remains uninfluenced in this respect by the switching position of the switching valve device 10'. As a consequence, a primary compressed air influence of the auxiliary air container 11 is achieved without actuating valves.

The disclosed embodiments is not limited to the two disclosed embodiments described above. On the contrary, deviations from the exemplary embodiments that are within the protective scope of the following claims are also feasible. It is thus also possible by way of example to embody the switching valve device as a pneumatically, hydraulically or mechanically controlled valve and to actuate the switching valve device using the corresponding control medium. In addition, it is also possible by way of example in lieu of the electrical pressure sensors to use mechanical pressure monitors or the like for monitoring the pressure level in the main air container 3 and also auxiliary air container 11. Moreover, it is possible for the valve element that is connected in parallel to the switching valve device 10 or 10' to also be configured as an actively actuated valve or the like. There is also no limitation within the claimed protective scope with regards to the embodiment of the compressor with or without an associated compressed air preparation and ventilating device.

LIST OF REFERENCE NUMERALS

1 Compressor
2 Electric motor
3 Main air container
4 Main air container line
5 Pantograph
6 Vehicle battery
7 Control unit
8 Inverter
9 Adjustment drive
10 Switching valve device
11 Auxiliary air container
12 Valve element
13 Pressure sensor
14 Pressure sensor

The invention claimed is:

1. A method for supplying main and auxiliary air in a vehicle having a compressor that is driven via an electric motor so as to generate compressed air for filling at least one main air container for supplying pneumatic units of the vehicle, the method comprising:
   supplying the vehicle with electrical energy via at least a first energy source and a second energy source; and
   operating a pneumatic adjustment drive so as to prepare the vehicle for use and activate the first energy source using the compressed air that is generated by the compressor,
   wherein the electric motor of the compressor is supplied in a preparation and activation phase via the second energy source,
   wherein the compressed air is supplied for preparing the vehicle for use in the preparation and activation phase via a 3/2 way valve switching valve device to an auxiliary air container that is allocated to the pneumatic adjustment drive when the switching valve device is in a first switching position, and
   wherein, otherwise the switching valve device supplies the compressed air that is generated by the compressor to the main air container when the switching valve device is in a second switching position.

2. The method of claim 1, wherein the switching valve device is activated by the pressure in the auxiliary air container such that, in response to the pressure level being below a minimum pressure, the auxiliary air container is refilled with compressed air.

3. The method of claim 1, wherein the switching valve device is activated by the pressure in the auxiliary air container such that, in response to a desired pressure being achieved, the main air container is filled when necessary.

4. The method of claim 1, wherein an output power of the compressor is set by an inverter, which is connected upstream of the electric motor, wherein the output power is set by varying the voltage and/or the frequency.

5. A device for supplying main and auxiliary air in a vehicle having a compressor that is driven via an electric motor so as to generate compressed air to fill at least one main air container for supplying pneumatic units of the vehicle, wherein the vehicle comprises at least a first energy source and a second energy source for supplying electrical energy, the device comprising:

a pneumatic adjustment drive provided to prepare the motor vehicle and to activate the first energy source using the compressed air that is generated by the compressor, wherein during a preparation and activation phase, the second energy source supplies the electric motor of the compressor;

a switching valve device that supplies the compressed air to an auxiliary air container that is allocated to the pneumatic adjustment drive for the preparation and activation phase, wherein, otherwise the switching valve device supplies the compressed air that is generated by the compressor to the main air container, wherein the switching valve device is a 3/2 way valve that in a first switching position supplies the supply pressure that is generated by the compressor to the auxiliary air container, and wherein a second switching position supplies the supply pressure that is generated by the compressor to the main air container.

6. The device of claim 5, further comprising a valve element provided that is connected in parallel to the switching valve device, wherein the valve element fills the auxiliary air container with compressed air from the main air container.

7. The device as of claim 6, wherein the valve element is configured as a spring-loaded non-return valve that has a through flow direction from the main air container to the auxiliary air container.

8. The device of claim 6, wherein the switching pressure of the switching valve device is below a nominal supply pressure of the main air container.

9. The device of claim 5, further comprising a control unit that provides a switching signal for actuating the switching valve device.

10. The device of claim 9, wherein the control unit is configured as an electronic control unit, and is electrically connected on an input side to a pressure sensor on the main air container and also to a pressure sensor on the auxiliary air container, wherein the electronic control unit determines the switching signal for the switching valve device that may be actuated in an electric manner and/or actuates the compressor.

11. The device of claim 5, wherein the first energy source is a pantograph and that the second energy source is configured as a vehicle battery.

12. The device of claim 5, wherein the pneumatic adjustment drive actuates a pantograph.

* * * * *